US012693746B2

(12) United States Patent
    Lee et al.

(10) Patent No.:     US 12,693,746 B2
(45) Date of Patent:        Jul. 28, 2026

(54) METHOD AND DEVICE FOR OUTPUTTING DRAWING DATA ON A VIRTUAL/AUGMENTE REALITY DEVICE USING AN INPUT DEVICE

(71) Applicant: SAMSUNG ELECTRONICS CO., LTD., Suwon-si (KR)

(72) Inventors: Jungjik Lee, Suwon-si (KR); Dasom Lee, Suwon-si (KR); Sungoh Kim, Suwon-si (KR); Hyungsok Yeo, Suwon-si (KR); Donghyun Yeom, Suwon-si (KR); Youngjoon Oh, Suwon-si (KR); Hyuntaek Woo, Suwon-si (KR); Sanghun Lee, Suwon-si (KR); Junsik Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/040,485

(22) Filed: Jan. 29, 2025

(65) Prior Publication Data

US 2025/0173003 A1      May 29, 2025

Related U.S. Application Data

(63) Continuation of application No. PCT/KR2023/008558, filed on Jun. 20, 2023.

(30) Foreign Application Priority Data

Aug. 1, 2022    (KR) ......................... 10-2022-0095581
Sep. 14, 2022   (KR) ......................... 10-2022-0115445

(51) Int. Cl.
    *G06F 3/033*        (2013.01)
    *G06F 3/01*         (2006.01)

(52) U.S. Cl.
    CPC .............. *G06F 3/033* (2013.01); *G06F 3/011* (2013.01)

(58) Field of Classification Search
    CPC ................................. G06F 3/033; G06F 3/011
    See application file for complete search history.

(56) References Cited

U.S. PATENT DOCUMENTS 10,290,155 B2    5/2019   Dorta et al.
10,311,647 B2    6/2019   Fuentes et al.
                 (Continued)

FOREIGN PATENT DOCUMENTS

KR        102112959 B1     5/2020
KR        20200100929 A    8/2020
                 (Continued)

OTHER PUBLICATIONS

Chen, Y., et al.; "iVRNote: Design, Creation and Evaluation of an Interactive Note-Taking Interface for Study and Reflection in VR Learning Environments", 2019 IEEE Conference on Virtual Reality and 3D User Interfaces (VR), Osaka, Japan, 2019, pp. 172-180, DOI: 10.1109/VR.2019.8798338.
                 (Continued)

*Primary Examiner* — Afroza Chowdhury
(74) *Attorney, Agent, or Firm* — CANTOR COLBURN LLP

(57)                ABSTRACT

A method for outputting drawing data according to an embodiment may comprise the operations of: outputting image data to an image area object in virtual reality or augmented reality, the image area object being an object determined on the basis of a user input among a plurality of real objects; generating a virtual input device object corresponding to an input device in relation to the input area object; receiving at least one of location information about the input device, state information about the input device, or
                 (Continued)

drawing data which includes information input to a second electronic device using the input device; updating the input device object on the basis of the received location information and state information, and outputting the updated device object; and updating the image data, output to the input area object, on the basis of the received drawing data.

15 Claims, 8 Drawing Sheets

(56)                References Cited

U.S. PATENT DOCUMENTS

| | | | | |
|---|---|---|---|---|
| 10,509,865 | B2 | 12/2019 | Hackett et al. | |
| 11,656,692 | B2 * | 5/2023 | Munakata | G06F 3/03545 |
| | | | | 345/173 |
| 2015/0302653 | A1 * | 10/2015 | Algreatly | G06F 3/041 |
| | | | | 345/633 |
| 2015/0363980 | A1 * | 12/2015 | Dorta | G06F 3/04883 |
| | | | | 345/419 |
| 2016/0370971 | A1 * | 12/2016 | Hackett | G06F 3/03545 |
| 2017/0280394 | A1 * | 9/2017 | Kim | H04M 1/73 |
| 2019/0050132 | A1 | 2/2019 | Rawlings et al. | |
| 2019/0171299 | A1 | 6/2019 | Sasaki et al. | |
| 2021/0012574 | A1 * | 1/2021 | Fu | G06F 3/017 |
| 2021/0278954 | A1 | 9/2021 | Nuber | |
| 2022/0083156 | A1 | 3/2022 | Munakata et al. | |

FOREIGN PATENT DOCUMENTS

| | | | |
|---|---|---|---|
| KR | 102288431 | B1 | 8/2021 |
| KR | 20220012073 | A | 2/2022 |
| KR | 20220088496 | A | 6/2022 |

OTHER PUBLICATIONS

International Search Report and Written Opinion for International Application No. PCT/KR2023/008558; International Filing Date Jun. 20, 2023; International Search Report Mail Date Sep. 14, 2023; 52.

Poupyrev, I., et al.; "Virtual Notepad: handwriting in immersive VR," Proceedings. IEEE 1998 Virtual Reality Annual International Symposium (Cat. No. 98CB36180), Atlanta, GA, USA, 1998, pp. 126-132, DOI: 10.1109/VRAIS.1998.658467.

* cited by examiner

METHOD AND DEVICE FOR OUTPUTTING DRAWING DATA ON A VIRTUAL/AUGMENTE REALITY DEVICE USING AN INPUT DEVICE

CROSS-REFERENCE TO RELATED APPLICATIONS

This application is a continuation application, claiming priority under § 365(c), of International Application No. PCT/KR2023/008558, filed on Jun. 20, 2023, which is based on and claims the benefit of Korean patent application number 10-2022-0115445, filed on Sep. 14, 2022, in the Korean Intellectual Property Office and of Korean patent application number 10-2022-0095581, filed on Aug. 1, 2022, in the Korean Intellectual Property Office, the disclosures of which are incorporated by reference herein in their entireties.

TECHNICAL FIELD

The following descriptions relate to a method and a device for outputting drawing data using an input device.

BACKGROUND ART

Virtual reality is technology that generates the illusion of a user being in a virtual three-dimensional (3D) space through computer graphics using a head mounted display (HMD) device. Augmented reality is technology that uses computer graphics to blend a virtual object with the real world, allowing the virtual object to be viewed within the real environment. The HMD is a device that renders computer graphics for both eyes, allowing a user to experience a sense of spatial depth. The HMD may be a device for implementing virtual reality or augmented reality.

The HMD may output drawing data generated through a pen-type input device in virtual reality or augmented reality. In this case, the user may perform drawing (or draw) using the input device, and the HMD may output the drawing data generated using the input device. The input device may take various forms, such as a pen, a touchpad, or a controller. In this scenario, the input device may be detachably attached to an electronic device other than the HMD, and the electronic device linked with the input device and the HMD may transmit and receive data related to the input device through communication.

The above information may be presented as the related art to help with the understanding of the disclosure. No arguments or decisions are made as to whether any of the above is applicable as a prior art related to the disclosure.

SUMMARY

A method for virtual/augmented includes outputting image data onto an input region object in the virtual/augmented reality, where the input region object is an object based on a user input. The method includes generating an input device object in relation to the input region object and receiving a detachment signal of the input device from a second electronic device connected to the input device. The method includes deactivating a hand tracking function, a head gaze function, and an eye gaze function of the first electronic device based on the detachment signal. The method includes receiving position information of the input device, state information of the input device, and drawing data, the drawing data including information input to the second electronic device. The method includes outputting the input device object based on the position information and the state information and updating the image data output, based on the drawing data.

DETAILED DESCRIPTION

Figure 1:
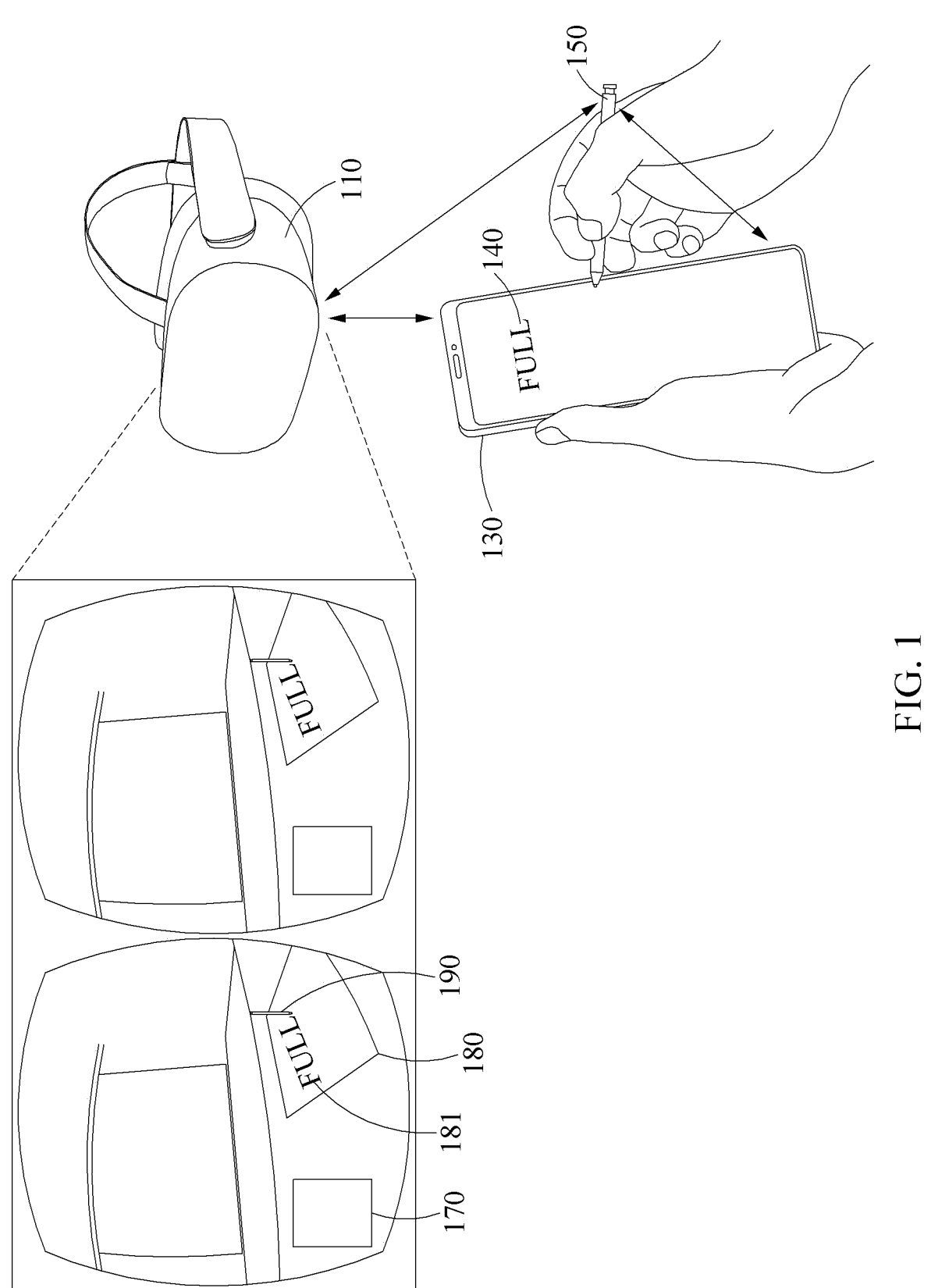
FIG. 1 is a diagram illustrating a result in which drawing data is output by a first electronic device, according to an embodiment.

The following structural or functional descriptions of examples disclosed in the present disclosure are merely intended for the purpose of describing the examples and the examples may be implemented in various forms. The embodiments are not meant to be limited, but it is intended that various modifications, equivalents, and alternatives are also covered within the scope of the claims.

Terms, such as first, second, and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled or joined to the second component. On the contrary, it should be noted that if it is described that one component is "directly connected", "directly coupled", or "directly joined" to another component, a third component may be absent. Expressions describing a relationship between components, for example, "between", "directly between", or "directly neighboring", etc., should be interpreted to be alike.

The singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms used herein including technical or scientific terms have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

The electronic devices according to various embodiments may be various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic devices are not limited to those described above.

Hereinafter, examples are described in detail with reference to the accompanying drawings. In the drawings, like reference numerals are used for like elements.

FIG. 1 is a diagram illustrating a result in which drawing data is output by a first electronic device, according to an embodiment.

FIG. 1 illustrates a first electronic device 110, a second electronic device 130, and an input device 150. The first electronic device 110 and the second electronic device 130 in FIG. 1 may be, for example, an electronic device 801 of FIG. 8, but examples are not limited thereto.

In an embodiment, the first electronic device 110 may be an electronic device that outputs virtual reality or augmented reality. For example, the first electronic device 110 may be a hardware device that provides binocular rendering. For example, the first electronic device 110 may include wireless communication technology and may communicate wirelessly with the second electronic device 130 or the input device 150.

In an embodiment, the second electronic device 130 may be connected to the first electronic device 110 and may communicate with an application included in the first electronic device 110. The application included in the first electronic device 110 may output a virtual object using binocular rendering. In addition, the first electronic device 110 may update image data based on drawing data and output the updated image data to virtual reality or augmented reality. The first electronic device 110 may include, for example, software related to the input device 150, but examples are not limited thereto. The first electronic device 110 may process data related to the input device 150 and transmit the processed data to the application through the software. The application may then output a virtual object based on the received data or output the updated image data based on the drawing data.

In an embodiment, the input device 150 may be a device for entering data to the second electronic device 130. For example, the input device 150 may input coordinates to a screen of the second electronic device 130. Accordingly, a user may perform drawing (e.g., draw) on the second electronic device 130 using the input device 150. In addition, the second electronic device 130 may generate drawing data based on the movement of the input device 150. The input device 150 may have, for example, the form of a pen, but examples are not limited thereto. Accordingly, the user may draw on the screen of the second electronic device 130 using the input device 150 in the form of a pen. The input device 150 may be, for example, detachable from the second electronic device 130 or may be a non-detachable device, but examples are not limited thereto. When the input device 150 is detachable from the second electronic device 130, the second electronic device 130 may detect whether the input device 150 is attached or detached to and from the second electronic device 130 through a sensor.

The second electronic device 130 according to an embodiment may generate drawing data input through the input device 150. As illustrated in FIG. 1, the drawing data input by the user to the second electronic device 130 using the input device 150 may be text "FULL" 140. The second electronic device 130 according to an embodiment may transmit the drawing data to the first electronic device 110. The first electronic device 110 may update image data based on the drawing data. The first electronic device 110 may output the updated image data onto an input region object 180. The input region object 180 may be an actual object onto which the image data is output. For example, referring to FIG. 1, the image data updated based on the drawing data may include text "FULL" 181 as displayed by the first electronic device 110.

The first electronic device 110 according to an embodiment may select and determine one of a plurality of actual objects as the input region object 180. For example, the first electronic device 110 may arbitrarily select the input region object 180. For example, the first electronic device 110 may select the input region object 180 based on a user selection. The user selection may be, for example, in various forms but examples are not limited thereto. The first electronic device 110 may determine a focused actual object as the input region object 180, based on at least one of a hand tracking function, a head gaze function, and an eye gaze function included in the first electronic device 110. For example, the input region object 180 may be a piece of paper, a whiteboard, or a wall that exists in the real world. When the user gazes at a predetermined actual object, the first electronic device 110 may determine the actual object as the input region object 180. Referring to FIG. 1, an actual object 1 170 and an actual object 2 may exist in the real world. In addition, the user may gaze at the actual object 2 for a predetermined period of time so that the actual object 2 may be focused. In this case, the first electronic device 110 may determine the actual object 2 as the input region object 180. In addition, image data may be output onto the input region object 180.

In an embodiment, the hand tracking function may be a function of tracking a hand gesture of the user recognized using a camera built into a head-mounted display (HMD). The first electronic device 110 may determine, as the input region object, an actual object selected by the hand of the user through the hand tracking function.

In an embodiment, the head gaze function may be a function for targeting an object in the direction the head of the user is facing. The first electronic device 110 may determine, as the input region object, an actual object that the head of the user is facing through the head gaze function.

In an embodiment, the eye gaze function may be a function for targeting an object in the direction of a gaze of the user. The first electronic device 110 may determine, as the input region object, an actual object at which the gaze of the user is directed through the eye gaze function.

The first electronic device 110 according to an embodiment may output a candidate object identifier that may be an input region object onto at least some of the plurality of actual objects existing in virtual reality or augmented reality. The first electronic device 110 may provide a visual effect and/or an auditory effect to the candidate object identifier. The candidate object identifier may be represented by various shapes, letters, and/or symbols. For example, referring to FIG. 1, the candidate object identifier may be output onto each of the actual object 1 170 and the actual object 2. The user may recognize which object may be the input region object through the candidate object identifier. Accordingly, as the user selects one of the actual objects having the candidate object identifier displayed, the first electronic device 110 may determine the selected actual object as the input region object 180.

In an embodiment, the image data may be an image that serves as a background for a drawing. For example, the image data may be an array in memory containing red, green, blue, alpha (RGBA) information. For example, the image data may be data that visualizes a document with text data. The first electronic device 110 according to an embodiment may output received image data or stored image data onto the input region object 180.

An input device object 190 according to an embodiment may be a virtual object generated by the first electronic device 110. The input device object 190 may have a similar shape to the input device 150 connected to the second electronic device 130. The input device object 190 may be a virtual object corresponding to the input device 150 in relation to the input region object 180.

Figure 2:
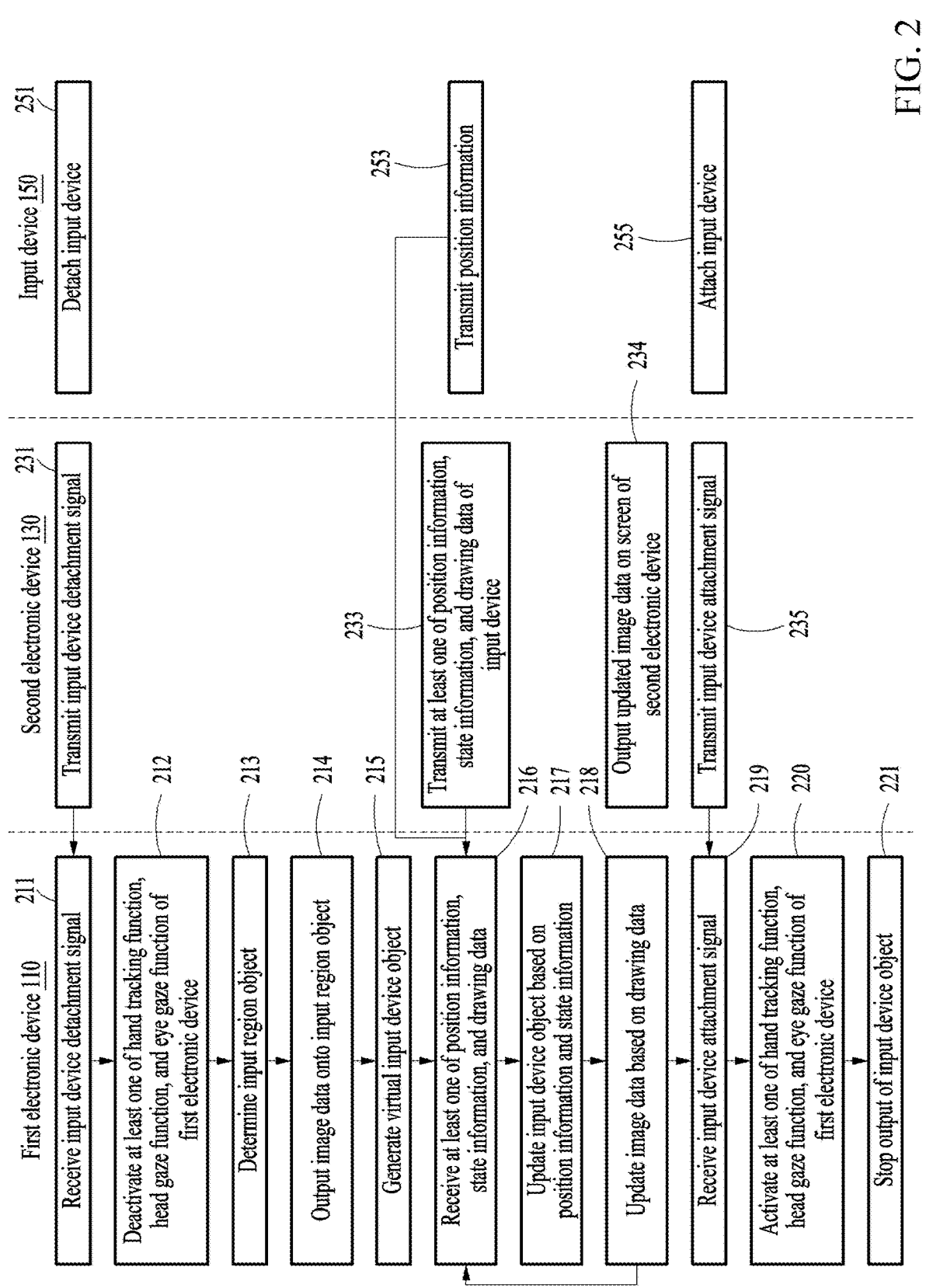
FIG. 2 is a flowchart illustrating a method in which a first electronic device outputs drawing data according to movement of an input device input to a second electronic device, according to an embodiment.

FIG. 2 is a flowchart illustrating a method in which the first electronic device 110 outputs drawing data according to the movement of the input device 150 input to the second electronic device 130, according to an embodiment.

The flowchart illustrated in FIG. 2 is only an example, and the order of operations may change, some of the operations may be omitted, and some of the operations may be performed simultaneously.

The first electronic device 110 according to an embodiment may receive (operation 211) an input device detachment signal from the second electronic device 130. The input device detachment signal may be a signal including the fact that the input device 150 is detached (operation 251) from the second electronic device 130. When the input device 150 is detached (operation 251) from the second electronic device 130, the detachment of the input device 150 may be recognized through a sensor of the second electronic device 130 and the input device detachment signal may be transmitted (operation 231) to the first electronic device 110.

The first electronic device 110 according to an embodiment may deactivate (operation 212) at least one of a hand tracking function, a head gaze function, and an eye gaze function of the first electronic device 110, based on the input device detachment signal. Deactivating at least one of the hand tracking function, the head gaze function, and the eye gaze function may reduce the power consumption of the first electronic device 110, thereby increasing the usage time of the first electronic device 110.

In an embodiment, the hand tracking function may be required to generate drawing data. Using the hand tracking function to generate the drawing data may increase the amount of computations of the first electronic device 110. However, when the drawing data is generated based on data input to the second electronic device 130 using the input device 150, the first electronic device 110 may receive the drawing data from the second electronic device 130 without using the hand tracking function and output the drawing data onto an input region object (e.g., the input region object 180 of FIG. 1). In this case, since the first electronic device 110 outputs the drawing data by receiving the drawing data from the second electronic device 130, there may be no need to consume a computing resource for the hand tracking function.

In addition, since drawing is performed on the second electronic device 130 using the input device 150, accurate and precise drawing data may be output to virtual reality or augmented reality using relatively fewer computing resources than when drawing is performed in the air. For example, when drawing is performed in the air, the hand tracking function may be used, but when the input device 150 and the second electronic device 130 are used, the hand tracking function may not be used.

The first electronic device 110 according to an embodiment may determine an input region object (operation 213). The input region object may be an object determined based on a user input from among the plurality of actual objects. The method of determining the input region object is described in detail with reference to FIG. 1, and thus a detailed description thereof is omitted with respect to FIG. 2.

The first electronic device 110 according to an embodiment may output (operation 214) image data onto the input region object. The image data output onto the input region object is described in detail with reference to FIG. 1, and thus a detailed description thereof is omitted with respect to FIG. 2.

The first electronic device 110 according to an embodiment may generate (operation 215) a virtual input device object (e.g., the input device object 190 of FIG. 1). For example, the input device object 190 is a virtual object generated by the first electronic device 110 and may have a similar shape to the input device 150 connected to the second electronic device 130. The input device object 190 may be a virtual object corresponding to the input device 150 in relation to the input region object 180. The first electronic device 110 may output the input device object 190 within a predetermined distance from the input region object 180. Through this, the user may recognize that an input device is present on the input region object 180.

The first electronic device 110 according to an embodiment may adjust the transparency of the input device object 190, based on the distance between the second electronic device 130 and the input device 150. A method of adjusting the transparency of the input device object 190 is described in detail below with reference to FIG. 3.

The first electronic device 110 according to an embodiment may receive (operation 216) at least one of position information of the input device 150, state information of the input device 150, and drawing data. The first electronic device 110 according to an embodiment may receive (operation 216) at least one of the position information, the state information, and the drawing data from the second electronic device 130. The second electronic device 130 according to an embodiment may transmit (operation 233) at least one of the position information, the state information, and the drawing data of the input device to the first electronic device 110. The first electronic device 110 according to an embodiment may also receive the position information from the input device 150. The input device 150 according to an embodiment may transmit (operation 253) the position information to the first electronic device 110.

In an embodiment, the position information may be position data generated in real time according to the movement of the input device 150. The position information may be data received to update the position of the input device object 190 in real time. The first electronic device 110 according to an embodiment may update the input device object 190 based on the position information received in real time.

In an embodiment, the state information may include information related to the state of the input device 150. The state information may refer to data generated when an event related to the input device 150 occurs. The event related to the input device 150 may not occur in real time like position information but may occur only when there is a change in the state of the input device 150. The state information may include at least one of data on whether the input device 150 is detached from the second electronic device 130, zoom level data, distance data between the input device 150 and the second electronic device 130, click data, drawing-type data, relative tilt data of the second electronic device 130 with respect to the first electronic device 110, and reference point data of a coordinate system of a drawing target region, which is at least a portion of image data.

In an embodiment, the data on whether the input device 150 is detached from the second electronic device 130 may be data related to data on whether the input device 150 is attached or detached to or from the second electronic device 130.

In an embodiment, the click data may be data related to a click motion input to the second electronic device 130 through the input device 150.

Figure 5:
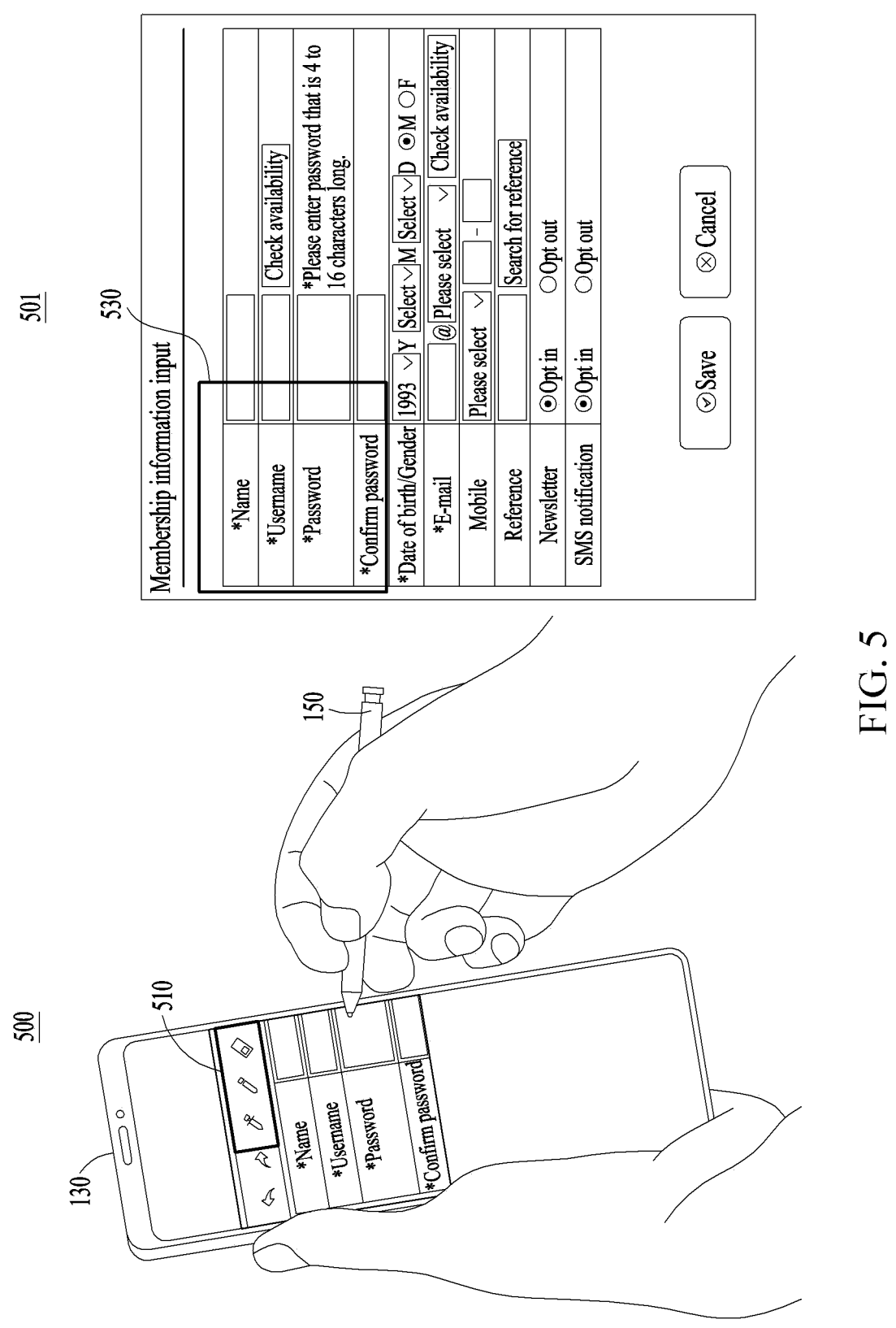
FIG. 5 is a diagram illustrating a method of outputting a drawing target region according to zoom, according to an embodiment.

In an embodiment, the drawing-type data may be data related to the type of the input device 150 for drawing. For example, the drawing-type data may include the type of pen, the thickness of a pen, the color of a pen, and/or an eraser. Referring to FIG. 5, a drawing-type object 510 may be output on the screen of the second electronic device 130, and a user may select the type of pen, the thickness of a pen, the color of a pen, and/or an eraser through the drawing-type object 510.

In an embodiment, the relative tilt data of the second electronic device 130 with respect to the first electronic device 110 may be data related to how much the second electronic device 130 is tilted with respect to the first electronic device 110. Conversely, the relative tilt data of the second electronic device 130 with respect to the first electronic device 110 may be data related to how much the first electronic device 110 is tilted with respect to the second electronic device 130. Tilt data may be produced through data obtained using a gyro sensor attached to each electronic device.

In an embodiment, when the image data is not completely output onto the input region object 180, there may be a case in which only a partial region of the image data is output onto the input region object 180. In this case, the first electronic device 110 may output only a partial region of the image data, and the partial region may be named as a drawing target region. Since the user may change the drawing target region in the entire image data, there may be a need to indicate the position of the drawing target region in the image data. Therefore, the reference point data of the drawing target region coordinate system may include position information of the drawing target region in the image data, which is the entire region.

The first electronic device 110 according to an embodiment may update (operation 217) the input device object 190, based on the position information and the state information. The first electronic device 110 according to an embodiment may update the distance between the input region object 180 and the input device object 190, based on the distance data between the input device 150 and the second electronic device 130. The first electronic device 110 according to an embodiment may update the input device object 190 based on the drawing-type data. For example, the input device object 190 may be updated depending on the type of pen.

The first electronic device 110 according to an embodiment may update (operation 218) the image data based on the drawing data.

The second electronic device 130 according to an embodiment may cause the image data updated based on the drawing data to be output (operation 234) on the screen of the second electronic device 130. The second electronic device 130 may update the image data based on the drawing data transmitted to the first electronic device 110 in operation 233. In other words, the second electronic device 130 may output (operation 234) the updated image data on the screen of the second electronic device 130. Through this, the user may synchronize and view drawing data, which is output in augmented reality or virtual reality, on the screen of the second electronic device 130.

The first electronic device 110 according to an embodiment may receive (operation 219) an input device attachment signal. The first electronic device 110 according to an embodiment may receive (operation 219) the input device attachment signal from the second electronic device 130 connected to the input device 150. When the input device 150 is attached (operation 255) to the second electronic device 130, the second electronic device 130 may transmit (operation 235) the input device attachment signal to the first electronic device 110.

In an embodiment, attaching the input device 150 to the second electronic device 130 may mean that the user no longer intends to draw on the second electronic device 130 using the input device 150. Accordingly, the first electronic device 110 according to an embodiment may activate (operation 220) at least one of the hand tracking function, the head gaze function, and the eye gaze function of the first electronic device 110. Through this, the first electronic device 110 may receive an input through a user motion rather than through the input device 150. In addition, the first electronic device 110 according to an embodiment may stop (operation 221) the output of the input device object 190. Because the input device 150 is no longer in use, there is no need for the input device object 190 to be output in augmented reality or virtual reality.

In an embodiment, the user in virtual reality or augmented reality may use the input device 150 to make accurate inputs in various situations that require precision, such as signing, entering information into blank spaces in documents, drawing, or taking notes in a presentation. This is because, for example, the first electronic device 110 may not need to recognize the motion of the input device 150 or the user through a camera while the input device 150 moves in the air. Instead, the first electronic device 110 may output the drawing generated by the input device 150, which is input through the second electronic device 130, in virtual reality and augmented reality.

In addition, by inputting data to the second electronic device 130 rather than in the air using the input device 150, the user may draw physically easy. When performing drawing in the air, the user may experience physical inconvenience since the user may have to keep raising an arm of the user to draw.

Figure 3:
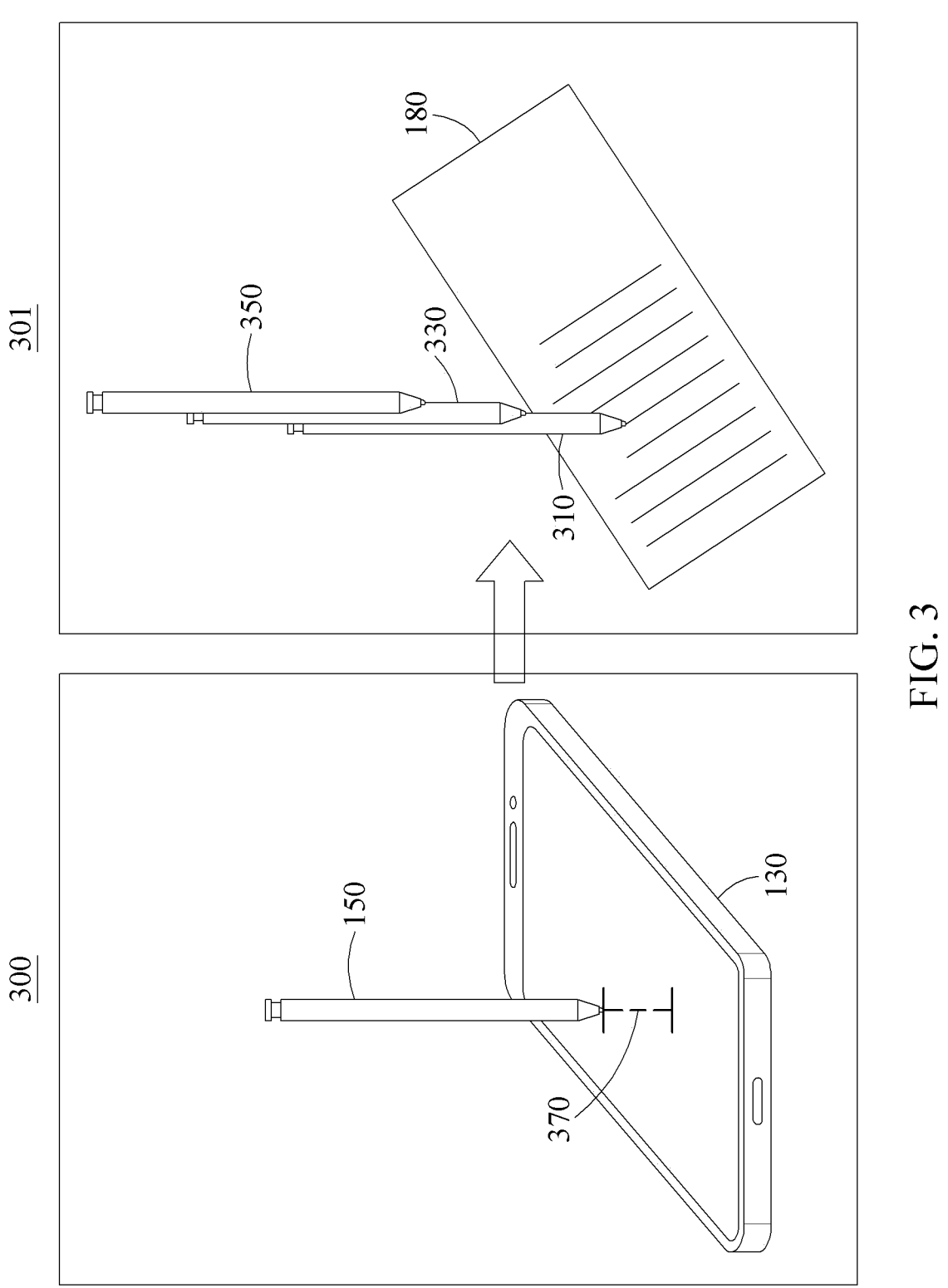
FIG. 3 is a diagram illustrating a method of determining transparency of an input device object, according to an embodiment.

FIG. 3 is a diagram illustrating a method of determining transparency of an input device object, according to an embodiment.

FIG. 3 illustrates a scene 300 for describing the distance between the second electronic device 130 and the input device 150 and a scene 301 for describing the process in which the transparency of the input device object 190 changes according to the distance.

The first electronic device 110 according to an embodiment may adjust the transparency of the input device object, based on the distance data 370 between the input device 150 and the second electronic device 130.

The first electronic device 110 according to an embodiment may adjust transparency to increase as the distance between the input device 150 and the second electronic device 130 increases. Referring to FIG. 3, the input device object may become gradually transparent as the distance from the input region object 180 increases. For example, the input device object 190 may be an object that is positioned farther away from the input region object 180 in the order of 310, 330, and 350. The input device object 190 may be an object with high transparency in the order of 310, 330, and 350.

The first electronic device 110 according to an embodiment may adjust the transparency to decrease as the distance between the input device 150 and the second electronic device 130 decreases. Referring to FIG. 3, the input device object may become clearer as the distance from the input region object 180 decreases. The input device object 190 may be an object that is close to the input region object 180 in the order of 350, 330, and 310. In this case, the input device object 190 may be an object with low transparency in the order of 350, 330, and 310.

Through this, the first electronic device 110 may provide the user with a visualized scene in virtual reality or augmented reality of how far the input device 150 is from the second electronic device 130.

Figure 4:
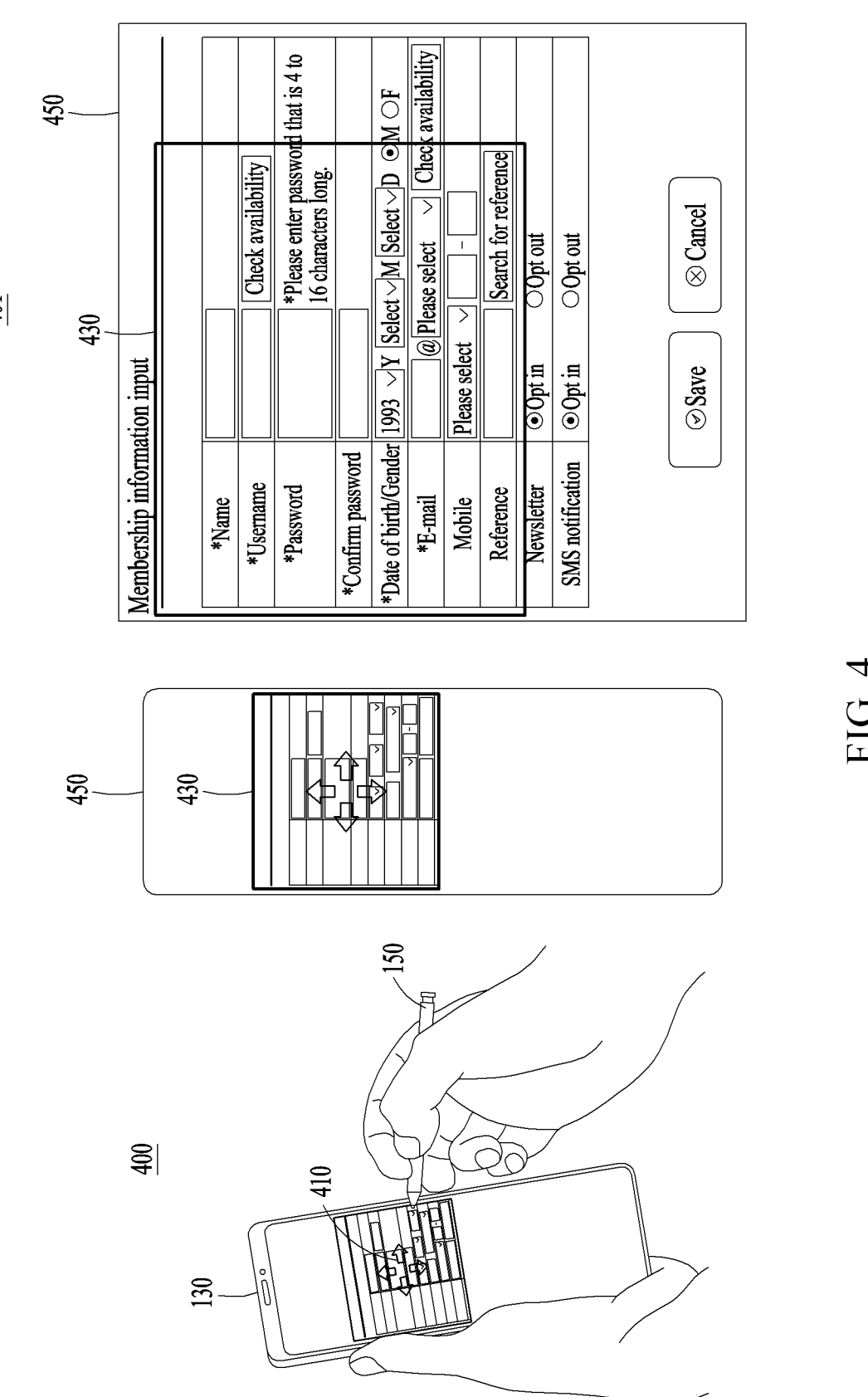
FIG. 4 is a diagram illustrating a method of outputting a drawing target region according to hovering, according to an embodiment.

FIG. 4 is a diagram illustrating a method of outputting a drawing target region according to hovering, according to an embodiment.

FIG. 4 illustrates, a scene 400 in which a user hovers using the input device 150, an arrow 410 indicating a hovering direction, an image 450 output by image data, and an entire area 401 of the image data.

In an embodiment, the size of the image output by the image data may be larger than the size of the input region object 180. For example, the horizontal length and the vertical length of the image may be greater than the horizontal length and the vertical length of the input region object 180. Referring to FIG. 4, the input region object 180 may be smaller than the image 450 output by the image data, and a region corresponding to the input region object 180 may be a drawing target region 430. In this case, the first electronic device 110 may output only a partial region of the image data onto the input region object 180. Since the user may draw on the partial region of the image data, the partial region of the image data may be the drawing target region 430.

The first electronic device 110 according to an embodiment may change the drawing target region 430, which is at least a portion of the image data, based on at least one of click data and position information. The second electronic device 130 according to an embodiment may recognize hovering over the second electronic device 130 using the input device 150, based on the position information. The second electronic device 130 according to an embodiment may determine a state in which a click input is maintained on the input device 150, based on the click data. When the user hovers over the second electronic device 130 using the input device 150 while clicking on the input device 150, the drawing target region 430 may change depending on the hovering direction 410.

The first electronic device 110 according to an embodiment may change the drawing target region 430 based on reference point data of a coordinate system of the drawing target region 430, which is at least a portion of the image data. The second electronic device 130 may recognize the hovering direction of the input device 150 and change the reference point. In addition, the changed reference point data may be transmitted to the first electronic device 110. The first electronic device 110 may receive, from the second electronic device 130, the reference point data changed according to the hovering direction of the input device 150 and move the reference point of the coordinate system of the drawing target region 430. The reference point of the coordinate system of the drawing target region 430 may be a single point in the drawing target region. For example, the reference point of the coordinate system of the drawing target region 430 may be the upper left corner of the drawing target region.

Through this, the user may view the entire region of the image output by the image data in augmented reality or virtual reality through control of the input device 150, even when the size of the input region object 180 is smaller than the image data.

FIG. 5 is a diagram illustrating a method of outputting a drawing target region according to zoom, according to an embodiment.

FIG. 5 illustrates a zoomed-in scene 500 of the screen of the second electronic device 130 and an entire area 501 of image data.

The first electronic device 110 according to an embodiment may enlarge or reduce a drawing target region, which is at least a portion of the image data, based on zoom level data. The second electronic device 130 may generate the zoom level data based on a user input and/or the input device 150. In FIG. 5, the user input may be a zoom-related input. For example, the user input may be pinch zoom. Pinch zoom may refer to multiple touches for zooming in or out. For example, a user may zoom in or out through the input device 150. The second electronic device 130 may receive the zoom-related input and generate the zoom level data. Then, the zoom level data may be transmitted to the first electronic device 110. The first electronic device 110 may determine a drawing target region 530 to be output onto the input region object 180 from among the entire image data, based on the zoom level data received from the second electronic device 130. For example, when zooming in (enlarging), a region occupied by the drawing target region 530 in the image data may decrease. For example, when zooming out (decreasing), the region occupied by the drawing target region 530 in the image data may increase.

Figures 6A, 6B:
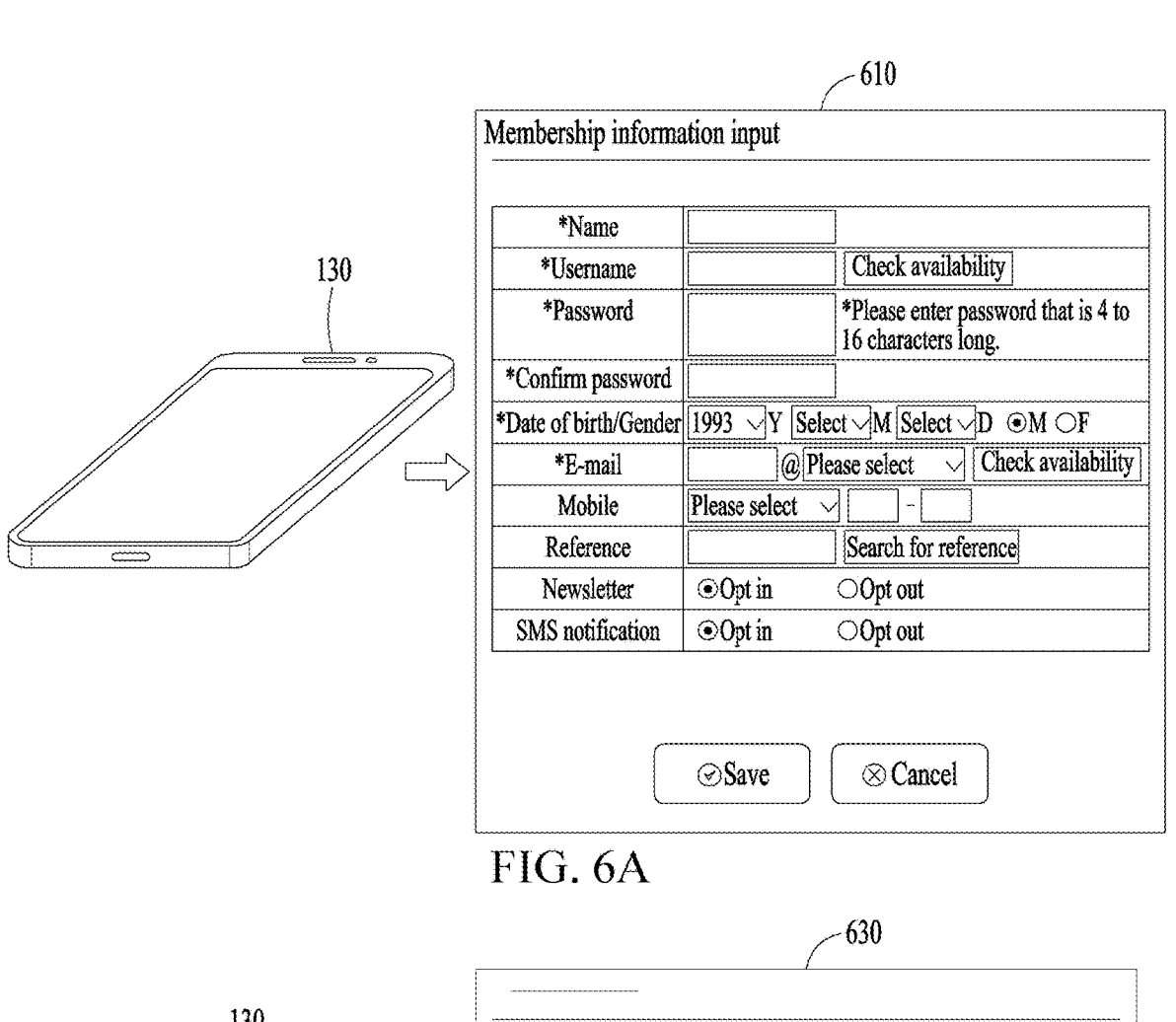
FIG. 6A is a diagram illustrating a method of adjusting transparency of image data output onto an input region object, based on a tilt between a viewpoint of a first electronic device and a screen of a second electronic device, according to an embodiment.
FIG. 6B is a diagram illustrating the method of adjusting transparency of image data output onto the input region object, based on the tilt between the viewpoint of the first electronic device and the screen of the second electronic device, according to an embodiment.

FIGS. 6A and 6B are diagrams illustrating a method of adjusting transparency of image data output onto an input region object, based on a tilt between a viewpoint of a first electronic device and a screen of a second electronic device, according to an embodiment.

FIGS. 6A and 6B respectively illustrate image data 610 with low transparency and image data 630 with high transparency.

In an embodiment, there may be a case in which the input region object 180 is substantially the same as the screen of the second electronic device 130. In this case, image data output onto the input region object 180 may be the same as image data output on the screen of the second electronic device 130. In that case, the two images may overlap and be seen by a user, making it difficult for the user to recognize the images. Accordingly, the first electronic device 110 or the second electronic device 130 may adjust the transparency of one of the two images so that the two images appear without overlapping (or interfering with one another).

The first electronic device 110 according to an embodiment may adjust the transparency of image data output onto the input region object 180, based on the relative tilt data of the second electronic device 130 with respect to the first electronic device 110.

The first electronic device 110 according to an embodiment may adjust the transparency of the image data output onto the input region object 180, based on the relative tilt data of the second electronic device 130 with respect to the first electronic device 110.

For example, the relative tilt data may be obtained from gyro sensor data of the first electronic device 110 and gyro sensor data of the second electronic device 130, as described above with reference to FIG. 1. Through this, the first electronic device 110 or the second electronic device 130 may determine the tilt formed by the viewpoint of the first electronic device 110 and the screen of the second electronic device 130.

The first electronic device 110 according to an embodiment may adjust the transparency of the image data output onto the input region object 180 to increase as the screen of the second electronic device 130 has a tilt that is perpendicular to the viewpoint of the first electronic device 110.

The more vertical the angle between the viewpoint of the first electronic device 110 and the screen of the second electronic device 130 is, the more parallel the image data output by the first electronic device 110 onto the input region object 180 and the image data output on the screen of the second electronic device 130 may become. As two pieces of image data become more parallel, the two images appear to overlap more to the user, so it may be necessary to increase the transparency of one of the images to prevent the images from appearing to overlap.

The first electronic device 110 according to an embodiment may adjust the transparency of the image data output onto the input region object 180 to decrease as the screen of the second electronic device 130 has a tilt horizontal to the viewpoint of the first electronic device 110. As the angle formed between the viewpoint of the first electronic device 110 and the screen of the second electronic device 130 becomes more horizontal, the image data output by the first electronic device 110 onto the input region object and the image data output on the screen of the second electronic device 130 may become nearly perpendicular to each other. As the two pieces of image data become more vertical, the two images appear to the user to overlap less, so even when the transparency of one of the images is set low, the images may not appear to overlap.

The second electronic device 130 according to an embodiment may adjust the transparency of the screen of the second electronic device 130, based on the relative tilt data of the second electronic device 130 with respect to the first electronic device 110.

The second electronic device 130 according to an embodiment may adjust the transparency of the screen of the second electronic device 130 to increase as the screen of the second electronic device 130 has a tilt that is perpendicular to the viewpoint of the first electronic device 110.

The second electronic device 130 according to an embodiment may adjust the transparency of the screen of the second electronic device 130 to decrease as the screen of the second electronic device 130 has a tilt horizontal to the viewpoint of the first electronic device 110.

Figure 7:
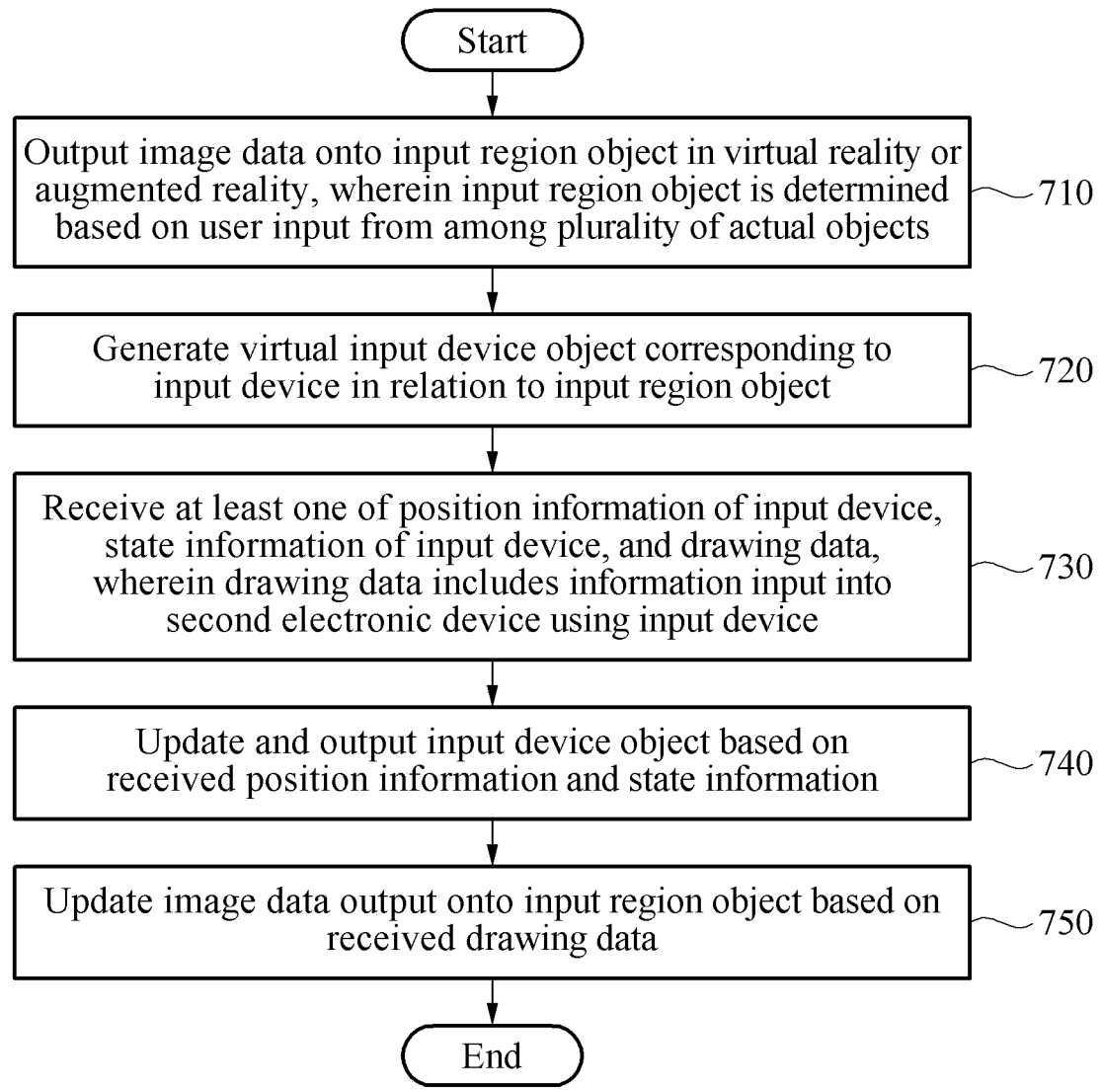
FIG. 7 is a flowchart illustrating a method of outputting drawing data, according to an embodiment.

FIG. 7 is a flowchart illustrating a method of outputting drawing data, according to an embodiment.

In virtual reality or augmented reality, a user may need an environment in which the user may accurately draw using the input device 150 in situations that require precision (e.g., signing, taking notes during a presentation, drawing, etc.). Furthermore, there may be a need to accurately recognize the user's drawing and output a drawing result in virtual reality or augmented reality. The present disclosure describes a method that allows the user to conveniently draw on an electronic device using an input device, rather than in the air, and outputs a drawing result in virtual reality or augmented reality.

An electronic device according to an embodiment may output (operation 710) image data onto the input region object 180 in virtual reality or augmented reality, wherein the input region object 180 is an object determined based on a user input among a plurality of actual objects (e.g., the actual object 1 170 and the actual object 2 of FIG. 1).

The electronic device according to an embodiment may generate (operation 720) a virtual input device object (e.g., the input device object 190 of FIG. 1 and 310, 330, and 350 of FIG. 3) corresponding to the input device 150 in relation to the input region object 180.

The electronic device according to an embodiment may receive (operation 730) at least one of position information of the input device 150, state information of the input device 150, and drawing data, the drawing data including information input to the second electronic device 130 using the input device 150.

The electronic device according to an embodiment may update and output (operation 740) the input device object (the input device object 190 of FIG. 1 and 310, 330, and 350 of FIG. 3), based on the received position information and state information.

The electronic device according to an embodiment may update (operation 750) image data output onto the input region object 180, based on the received drawing data.

In an embodiment, since a drawing result of the input device 150 recognized by the second electronic device 130 is output through the first electronic device 110, the first electronic device 110 may not recognize a user motion. Therefore, by turning off a function for recognizing the user motion, the amount of computations and strategy (or power) consumption may be saved.

The electronic device according to an embodiment may determine the input region object 180 based on at least one of a user selection input, a hand tracking function, a head gaze function, and an eye gaze function.

Since the image data needs to be output onto an actual object, there may be a need for the user to select the actual object onto which the drawing result is output and output the image data onto that actual object. However, since the user may not know which object may output the image data, the first electronic device 110 may output an identifier onto the actual object. Through this, the user may know which objects the drawing result may be output to.

The electronic device according to an embodiment may output a candidate object identifier that may be the input region object 180 onto at least some of a plurality of actual objects existing in virtual reality or augmented reality.

Since the drawing result output in virtual reality or augmented reality is also output onto the second electronic device 130, the user may view the drawing result on the screen of the second electronic device 130.

The electronic device according to an embodiment may cause the image data updated based on the drawing data to be output on the screen of the second electronic device 130 by transmitting the updated image data to the second electronic device 130.

Since the virtual input device object may need to reflect the movement of the actual input device 150 in real time, the position information of the input device 150 may be transmitted to the first electronic device 110 in real time.

The position information according to an embodiment is position data generated in real time according to the movement of the input device 150 and may be data received to update the position of the input device object (190 of FIG. 1 and 310, 330, and 350 of FIG. 3) in real time.

Since state information only notifies the first electronic device 110 of a particular event when the particular event occurs and thus performs a motion corresponding to the event, there may be no need for data to be transmitted in real time like the position information.

The state information according to an embodiment is data generated when an event related to the input device 150 occurs and may include at least one of data on whether the input device 150 is detached from the second electronic device 130, zoom level data, the distance data 370 between the input device 150 and the second electronic device 130, click data, drawing-type data, relative tilt data of the second electronic device 130 with respect to the first electronic device 110, and reference point data of a drawing target region coordinate system, which is at least a portion of the image data.

Since the detachment signal is a signal that the user intends to draw using the input device 150, the detachment signal may be a trigger signal for a method of outputting drawing data.

The electronic device according to an embodiment may receive a detachment signal of the input device 150 from the second electronic device 130 connected to the input device 150.

The electronic device according to an embodiment may deactivate at least one of a hand tracking function, a head gaze function, and an eye gaze function of the first electronic device 110 based on the detachment signal.

Since an attachment signal is a signal that the user intends to stop drawing using the input device 150, the attachment signal may be a signal to end an operation of outputting drawing data.

The electronic device according to an embodiment may receive an attachment signal of the input device 150 from the second electronic device 130 connected to the input device 150.

The electronic device according to an embodiment may activate at least one of the hand tracking function, the head gaze function, and the eye gaze function and stop the output of the input device object (190 of FIG. 1 and 310, 330, and 350 of FIG. 3).

By visualizing the input device object 190 more transparently as the input device object 190 gets farther away from the input region object 180 onto which image data is output, the first electronic device 110 may visually express the increasing distance between the second electronic device 130 and the input device 150 in virtual reality or augmented reality.

The electronic device according to an embodiment may adjust the transparency of the input device object 190, based on the distance data 370 between the input device 150 and the second electronic device 130.

The electronic device according to an embodiment may adjust transparency to increase as the distance between the input device 150 and the second electronic device 130 increases.

The electronic device according to an embodiment may adjust transparency to decrease as the distance between the input device 150 and the second electronic device 130 decreases.

The size of an image output by the image data may be larger than the size of the input region object 180. For example, the horizontal length and the vertical length of the image may be greater than the horizontal length and the vertical length of the input region object 180. Therefore, when only a portion of the image data is output onto the input region object 180, the user may need to change a partial region output onto the input region object 180.

The electronic device according to an embodiment may change a drawing target region (430 of FIG. 4 and 530 of FIG. 5), which is at least a portion of image data, based on at least one of click data and position information.

The user may intend to enlarge or reduce the partial region of the image output by the image data. Therefore, a function for enlarging and reducing the partial region of the image may be required.

The electronic device according to an embodiment may enlarge the drawing target region (430 of FIG. 4 and 530 of FIG. 5), which is at least a portion of the image data, based on zoom level data.

The electronic device according to an embodiment may reduce the drawing target region (430 of FIG. 4 and 530 of FIG. 5), which is at least a portion of the image data, based on the zoom level data.

There may be a case in which the input region object 180 is the same as the screen of the second electronic device 130. In this case, image data output onto the input region object 180 may be the same as image data output on the screen of the second electronic device 130. In that case, the two images may overlap and be seen by a user, making it difficult for the user to recognize the images.

When the input region object 180 is the same as the screen of the second electronic device 130, the electronic device according to an embodiment may adjust the transparency of the image data output onto the input region object 180, based on the relative tilt data of the second electronic device 130 with respect to the first electronic device 110.

The electronic device according to an embodiment may increase the transparency of the image data output onto the input region object as the screen of the second electronic device has a tilt perpendicular to the viewpoint of the first electronic device.

The electronic device according to an embodiment may decrease the transparency of the image data output onto the input region object 180 as the screen of the second electronic device 130 has a tilt horizontal to the viewpoint of the first electronic device 110.

When the input region object 180 is the same as the screen of the second electronic device 130, the electronic device according to an embodiment may adjust the transparency of the screen of the second electronic device 130, based on the relative tilt data of the second electronic device 130 with respect to the first electronic device 110.

The electronic device according to an embodiment may increase the transparency of the screen of the second electronic device 130 as the screen of the second electronic device 130 has a tilt perpendicular to the viewpoint of the first electronic device 110.

The electronic device according to an embodiment may decrease the transparency of the screen of the second electronic device 130 as the screen of the second electronic device 130 has a tilt horizontal to the viewpoint of the first electronic device 110.

The electronic device according to an embodiment that is detached or attached from or to the input device 150 may include one or more processors, the input device 150, and a memory.

The electronic device according to an embodiment may generate drawing data input through the input device 150.

The electronic device according to an embodiment may transmit at least one of position information, state information, and drawing data of the input device 150 to an output device that outputs virtual reality or augmented reality.

The electronic device according to an embodiment may output image data updated based on the drawing data on a screen of the electronic device.

When the input device 150 is detached from the electronic device, the electronic device according to an embodiment may transmit an input device detachment signal to the output device.

When the input device 150 is attached to the electronic device, the electronic device according to an embodiment may transmit an input device attachment signal to the output device.

The electronic device according to an embodiment may include a computer program stored in a computer-readable storage medium to execute at least one instruction.

Figure 8:
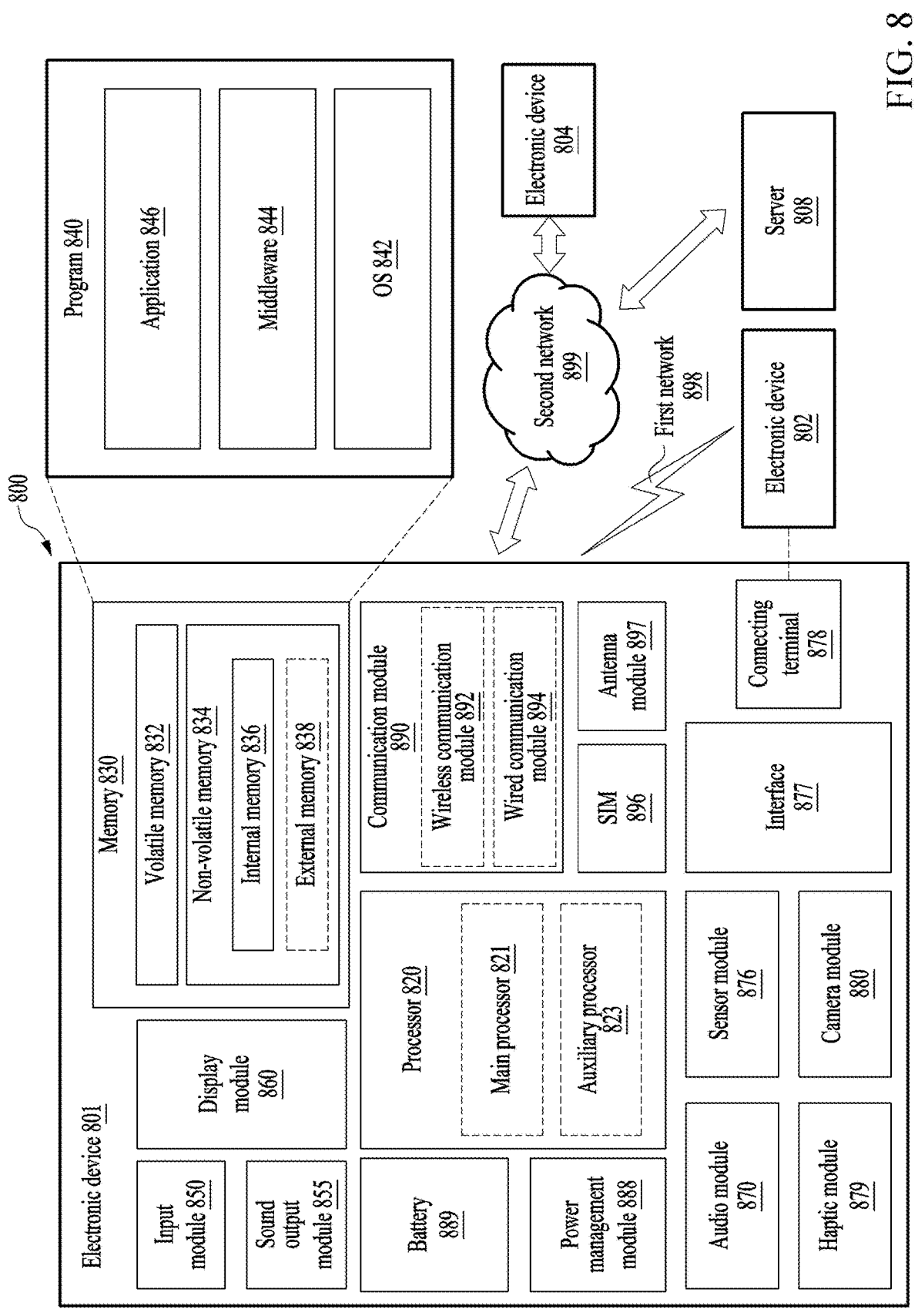
FIG. 8 is a block diagram illustrating an electronic device in a network environment, according to various embodiments.

FIG. 8 is a block diagram illustrating an electronic device in a network environment, according to various embodiments.

FIG. 8 is a block diagram illustrating an electronic device 801 in a network environment 800. Referring to FIG. 8, the electronic device 801 in the network environment 800 may communicate with an electronic device 802 via a first network 898 (e.g., a short-range wireless communication network) or communicate with at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, a memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added to the electronic device 801. In some embodiments, some of the components (e.g., the sensor module 876, the camera module 880, or the antenna module 897) may be integrated as a single component (e.g., the display module 860).

The processor 820 may execute, for example, software (e.g., a program 840) to control at least one other component (e.g., a hardware or software component) of the electronic device 801 connected to the processor 820 and may perform various data processing or computation. According to an embodiment, as at least a part of data processing or computation, the processor 820 may store a command or data received from another component (e.g., the sensor module 876 or the communication module 890) in a volatile memory 832, process the command or the data stored in the volatile memory 832, and store resulting data in a non-volatile memory 834. According to an embodiment, the processor 820 may include the main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with the main processor 821. For example, when the electronic device 801 includes the main processor 821 and the auxiliary processor 823, the auxiliary processor 823 may be adapted to consume less power than the main processor 821 or to be specific to a specified function. The auxiliary processor 823 may be implemented separately from the main processor 821 or as a part of the main processor 821.

The auxiliary processor 823 may control at least some of functions or states related to at least one (e.g., the display module 860, the sensor module 876, or the communication module 890) of the components of the electronic device 801, instead of the main processor 821 while the main processor 821 is in an inactive (e.g., sleep) state or along with the main processor 821 while the main processor 821 is an active state (e.g., executing an application). According to an embodiment, the auxiliary processor 823 (e.g., an ISP or a CP) may be implemented as a portion of another component (e.g., the camera module 880 or the communication module 890) that is functionally related to the auxiliary processor 823. According to an embodiment, the auxiliary processor 823 (e.g., an NPU) may include a hardware structure specified for processing of an artificial intelligence (AI) model. The AI model may be generated by machine learning. Such learning may be performed by, for example, the electronic device 801 in which an AI model is executed, or performed via a separate server (e.g., the server 808). A learning algorithm may include, but is not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 830 may store various pieces of data used by at least one component (e.g., the processor 820 or the sensor module 876) of the electronic device 801. The various pieces of data may include, for example, software (e.g., the program 840) and input data or output data for a command related thereto. The memory 830 may include the volatile memory 832 or the non-volatile memory 834.

The program 840 may be stored as software in the memory 830, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output a sound signal to the outside of the electronic device 801. The sound output module 855 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 860 may visually provide information to the outside (e.g., a user) of the electronic device 801. The display module 860 may include, for example, a display, a hologram device, or a projector and control circuitry to control a corresponding one of the display, the hologram device, and the projector. According to an embodiment, the display module 860 may include a touch sensor adapted to sense a touch, or a pressure sensor adapted to measure an intensity of a force incurred by the touch.

The audio module 870 may convert a sound into an electric signal and vice versa. According to an embodiment, the audio module 870 may obtain the sound via the input module 850 or output the sound via the sound output module 855 or an external electronic device (e.g., the electronic device 802 such as a speaker or a headphone) directly or wirelessly connected to the electronic device 801.

The sensor module 876 may detect an operational state (e.g., power or temperature) of the electronic device 801 or an environmental state (e.g., a state of a user) external to the electronic device 801, and generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., by wire) or wirelessly. According to an embodiment, the interface 877 may include, for example, a high-definition multimedia interface (HDMI), a universal serial bus (USB) interface, a secure digital (SD) card interface, or an audio interface.

The connecting terminal 878 may include a connector via which the electronic device 801 may be physically connected to an external electronic device (e.g., the electronic device 802). According to an embodiment, the connecting terminal 878 may include, for example, an HDMI connector, a USB connector, an SD card connector, or an audio connector (e.g., a headphone connector).

The haptic module 879 may convert an electric signal into a mechanical stimulus (e.g., a vibration or a movement) or an electrical stimulus which may be recognized by a user via his or her tactile sensation or kinesthetic sensation. According to an embodiment, the haptic module 879 may include, for example, a motor, a piezoelectric element, or an electric stimulator.

The camera module 880 may capture a still image and moving images. According to an embodiment, the camera module 880 may include one or more lenses, image sensors, ISPs, or flashes.

The power management module 888 may manage power supplied to the electronic device 801. According to an embodiment, the power management module 888 may be implemented as, for example, at least a part of a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more CPs that are operable independently of the processor 820 (e.g., an AP) and that support a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module, or a power line communication (PLC) module). A corresponding one of these communication modules may communicate with the external electronic device 804 via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a fifth generation (5G) network, a next-generation communication network, the Internet, or a computer network (e.g., a LAN or a wide region network (WAN)). These various types of communication modules may be implemented as a single component (e.g., a single chip), or may be implemented as multi components (e.g., multiple chips) separate from each other. The wireless communication module 892 may identify and authenticate the electronic device 801 in a communication network, such as the first network 898 or the second network 899, using subscriber information (e.g., international mobile subscriber identity (IMSI)) stored in the SIM 896.

The wireless communication module 892 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., a mmWave band) to achieve, e.g., a high data transmission rate. The wireless communication module 892 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., an external electronic device) of the electronic device 801. According to an embodiment, the antenna module 897 may include an antenna including a radiating element including a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in a communication network, such as the first network 898 or the second network 899, may be selected by, for example, the communication module 890 from the plurality of antennas. The signal or power may be transmitted or received between the communication module 890 and the external electronic device via the at least one selected antenna. According to an embodiment, another component (e.g., a radio frequency integrated circuit (RFIC)) other than the radiating element may be additionally formed as a part of the antenna module 897.

According to various embodiments, the antenna module 897 may form a mm Wave antenna module. According to an embodiment, the mmWave antenna module may include a PCB, an RFIC disposed on a first surface (e.g., a bottom surface) of the PCB or adjacent to the first surface and capable of supporting a designated high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the external electronic devices 802 or 804 may be a device of the same type as or a different type from the electronic device 801. According to an embodiment, all or some of operations to be executed by the electronic device 801 may be executed at one or more external electronic devices (e.g., the external electronic devices 802 and 804, and the server 808). For example, if the electronic device 801 needs to perform a function or a service automatically, or in response to a request from a user or another device, the electronic device 801, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or MEC. In another embodiment, the external electronic device 804 may include an Internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., a smart home, a smart city, a smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the present disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if a component (e.g., a first component) is referred to, with or without the term "operatively" or "communicatively," as "coupled with," "coupled to," "connected with," or "connected to" another component (e.g., a second component), the component may be coupled with the other component directly (e.g., by wire), wirelessly, or via a third component.

As used in connection with various embodiments of the present disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., the internal memory 836 or the external memory 838) that is readable by a machine (e.g., the electronic device 801). For example, a processor (e.g., a processor 820) of the machine (e.g., the electronic device 801) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method for a first electronic device outputting virtual reality or augmented reality, the method comprising:
   outputting image data onto an input region object in the virtual reality or the augmented reality, wherein the input region object is an object determined based on a user input from among a plurality of actual objects;
   generating an input device object corresponding to an input device in relation to the input region object;
   receiving a detachment signal of the input device from a second electronic device connected to the input device, wherein the second electronic device is connected to the first device to communicate with an application included in the first electronic device;
   deactivating, based on the detachment signal of the input device from the second electronic device, at least one input function of the first electronic device, wherein the at least one input function corresponds to at least one user motion;
   receiving, based on the detachment signal of the input device from the second electronic device, at least one of position information of the input device, state information of the input device, and drawing data, the drawing data comprising information input to the second electronic device using the input device;
   updating and outputting the input device object based on the position information and the state information; and updating the image data output onto the input region object, based on the drawing data.

2. The method of claim 1, wherein the generating of the input region object comprises determining the input region object based on at least one of a user selection input, a hand tracking function, a head gaze function, and an eye gaze function.

3. The method of claim 1, further comprising:
   outputting a candidate object identifier, which is to become the input region object, onto at least some of the plurality of actual objects existing in the virtual reality or the augmented reality.

4. The method of claim 1, further comprising:
   transmitting the image data that is updated to the second electronic device such that the image data updated based on the drawing data is output on a screen of the second electronic device.

5. The method of claim 1, wherein the position information is data generated in real time according to movement of the input device and received to update a position of the input device object in real time.

6. The method of claim 1, wherein the state information is data generated when an event related to the input device occurs and comprises at least one of data on whether the input device is detached from the second electronic device, zoom level data, distance data between the input device and the second electronic device, click data, drawing-type data, relative tilt data of the second electronic device with respect to the first electronic device, and reference point data of a drawing target region coordinate system, which is at least a portion of the image data.

7. The method of claim 1, wherein the deactivating comprises:
   deactivating at least one of a hand tracking function, a head gaze function, and an eye gaze function of the first electronic device based on the detachment signal.

8. The method of claim 1, further comprising:
   receiving an attachment signal of the input device from the second electronic device connected to the input device;
   activating at least one at least one input function of the first electronic device, wherein the at least one input function corresponds to at least one user motion; and
   stopping output of the input device object.

9. The method of claim 1, further comprising:
   adjusting transparency of the input device object, based on distance data between the input device and the second electronic device.

10. The method of claim 9, wherein the adjusting of the transparency of the input device object comprises adjusting the transparency to increase as a distance between the input device and the second electronic device increases or adjusting the transparency to decrease as the distance between the input device and the second electronic device decreases.

11. The method of claim 1, further comprising one of:
   changing a drawing target region, which is at least a portion of the image data, based on at least one of click data and the position information; and
   enlarging or reducing the drawing target region, based on zoom level data.

12. The method of claim 1, further comprising:
   when the input region object is a same as a screen of the second electronic device, adjusting transparency of the image data output onto the input region object, based on relative tilt data of the second electronic device with respect to the first electronic device.

13. The method of claim 12, wherein the adjusting of the transparency of the image data output onto the input region object comprises increasing the transparency of the image data output onto the input region object as the screen of the second electronic device has a tilt perpendicular to a viewpoint of the first electronic device or decreasing the transparency of the image data output onto the input region object as the screen of the second electronic device has a tilt horizontal to the viewpoint of the first electronic device.

14. The method of claim 12, further comprising:

when the input region object is the same as the screen of the second electronic device, adjusting the transparency of the second electronic device, based on the relative tilt data of the second electronic device with respect to the first electronic device.

15. An electronic device for outputting virtual reality or augmented reality, the electronic device comprising:

at least one processor; and a memory storing instructions that, when executed by the at least one processor individually or collectively, cause the electronic device to:

output image data onto an input region object in the virtual reality or the augmented reality, wherein the input region object is an object determined based on a user input from among a plurality of actual objects;

generate a virtual input device object corresponding to an input device in relation to the input region object;

receive a detachment signal of the input device from a second electronic device connected to the input device, wherein the second electronic device is connected to the first device to communicate with an application included in the first electronic device;

deactivate, based on the detachment signal of the input device from the second electronic device, at least one input function of the first electronic device, wherein the at least one input function corresponds to at least one user motion;

receive, based on the detachment signal of the input device from the second electronic device, at least one of position information of the input device, state information of the input device, and drawing data, the drawing data comprising information input to the second electronic device using the input device;

update and output the virtual input device object, based on the position information and the state information; and update the image data output onto the input region object, based on the drawing data.

* * * * *